W. E. NESTOR.
VALVE.
APPLICATION FILED JULY 1, 1918.

1,322,600.

Patented Nov. 25, 1919.

WITNESSES
R. E. Rousseau.

INVENTOR
W. E. Nestor,
BY
Munn & Co.
ATTORNEYS

UNITED STATES PATENT OFFICE.

WILLIAM EDWARD NESTOR, OF WAYNESBURG, PENNSYLVANIA.

VALVE.

1,322,600.  Specification of Letters Patent.  Patented Nov. 25, 1919.

Application filed July 1, 1918.  Serial No. 242,808.

*To all whom it may concern:*

Be it known that I, WILLIAM E. NESTOR, a citizen of the United States, and a resident of Waynesburg, in the county of Greene and State of Pennsylvania, have invented certain new and useful Improvements in Valves, of which the following is a specification.

My invention is an improvement in valves, and has for its object to provide a valve especially designed for the inlet or discharge valves of gas or air compressors, wherein the valve is a plate normally spring pressed into closed position, and adapted to open under pressure, and wherein means is provided for regulating the extent of opening of the valve and the tension of the spring.

The present embodiment of the invention is shown in connection with a compressor 1 of ordinary construction, and the valve comprises a valve body 2 in the form of a plug, having a series of longitudinally extending passages or ports 3, the plug being threaded to engage within a threaded opening 4 in the compressor.

Figure 1:
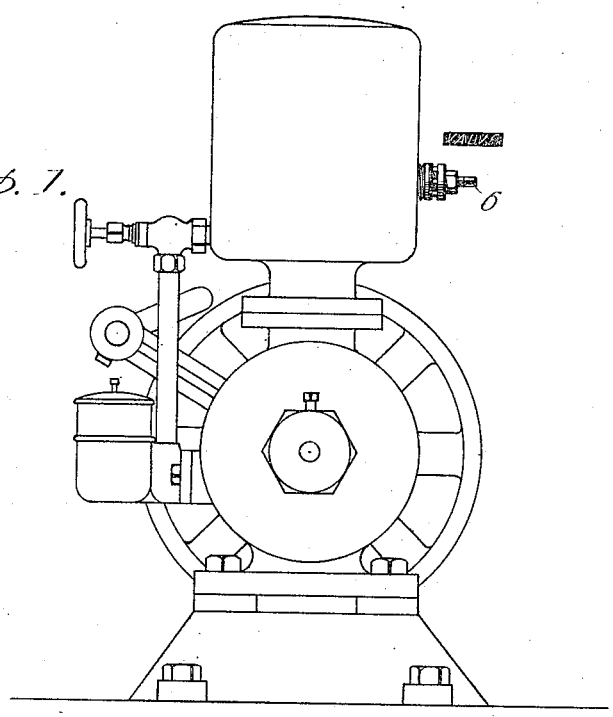
Figure 1 is an end view of a compressor having the improved valve.
Figure 2:
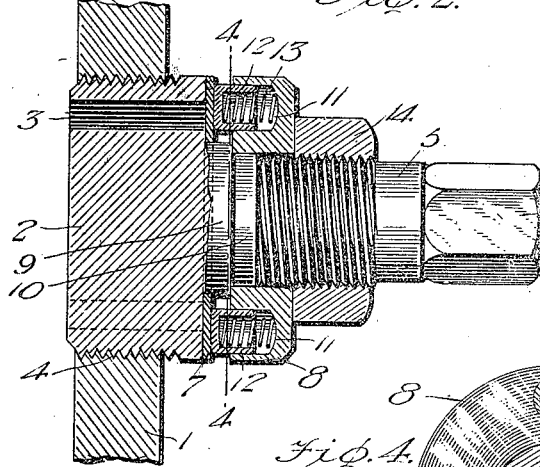
Fig. 2 is a longitudinal section through the valve.
Figure 3:
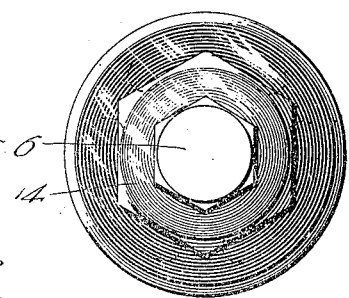
Fig. 3 is an end view of the valve.
Figure 4:
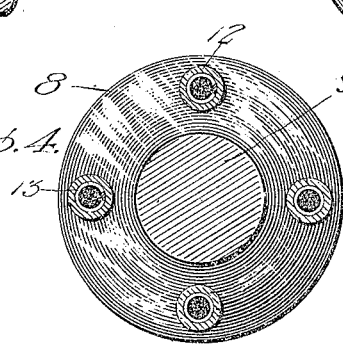
Fig. 4 is a section on the line 4—4 of Fig. 2.

The plug or body 2 has a stem 5, which has a polygonal portion 6 at its outer end for engagement by a wrench or the like, and the valve, which is in the form of a washer 7, encircles the stem at the plug, the stem being cyclindrical at this point. A ring 8 is arranged on the stem outside of the valve 7, and it will be noticed, referring to Fig. 2, that the stem has two cylindrical portions 9 and 10 of unequal diameter, the portion 9 being of a larger diameter and being engaged by the valve, while the portion 10 of smaller diameter engages within a cylindrical portion in the bore of the ring 8.

This ring, on its inner face, has recesses 11, and a cap 12 is arranged in each recess, the open end of the cap being within the recess. A coil spring 13 is arranged within each recess between the cap and the bottom of the recess, and the closed ends of the caps bear against the valve, the springs acting normally to hold the valve closed but permitting it to yield under pressure, it being understood that the valve arranged as shown is an outlet valve. With the position reversed, however, it would act equally well as an inlet valve. The ring 8 is locked on the stem by a lock nut 14 also polygonal in outline.

The caps or cups 12 hold the springs in alinement and protect them from becoming distorted and working out of the recesses, and the valve may be used either as an intake or discharge valve. To remove the entire valve a wrench is engaged with the polygonal portion 6.

The improved valve is especially designed as an automatic fuel inlet of an admission valve for gas engines, or for inlet or discharge valves on air or gas compressors.

I claim:

A valve comprising a plug adapted to engage an opening and having an annular series of ports or passages spaced apart from each other at equal distances, and having a stem at the axis of the series, a washer encircling the stem for closing the outer ends of the ports and freely movable on the stem, a ring fitting on the stem outside of the washer, the ring having recesses on its inner face corresponding in number and spacing to the number and spacing of the ports, a cap slidable in each recess and adapted to engage the washer, springs within the recesses and normally pressing the caps toward the valve to hold the valve tightly over the ports, said stem having a polygonal outer end for engagement by a wrench to permit the simultaneous removal and attachment of the plug and the parts carried thereby.

WILLIAM EDWARD NESTOR.

Signed in the presence of—

ASA SELLERS,
L. W. SAYERS.